US010697376B2

(12) United States Patent
Abbasian

(10) Patent No.: US 10,697,376 B2
(45) Date of Patent: Jun. 30, 2020

(54) INDUCTION SWITCHED RELUCTANCE MOTOR

(71) Applicant: Mohammadali Abbasian, Isfahan (IR)

(72) Inventor: Mohammadali Abbasian, Isfahan (IR)

( * ) Notice: Subject to any disclaimer, the term of this patent is extended or adjusted under 35 U.S.C. 154(b) by 260 days.

(21) Appl. No.: 15/682,540

(22) Filed: Aug. 21, 2017

(65) Prior Publication Data

US 2017/0370296 A1 Dec. 28, 2017

Related U.S. Application Data

(60) Provisional application No. 62/377,756, filed on Aug. 22, 2016.

(51) Int. Cl.
| | | |
|---|---|---|
| *H02K 3/00* | (2006.01) | |
| *F02C 9/24* | (2006.01) | |
| *F23N 5/00* | (2006.01) | |
| *H02K 19/10* | (2006.01) | |
| *H02K 19/12* | (2006.01) | |
| *H02K 29/03* | (2006.01) | |

(52) U.S. Cl.
CPC ............. *F02C 9/24* (2013.01); *F23N 5/003* (2013.01); *H02K 19/103* (2013.01); *H02K 19/12* (2013.01); *H02K 29/03* (2013.01)

(58) Field of Classification Search
CPC ........ H02K 19/00; H02K 19/02; H02K 19/06; H02K 19/10; H02K 19/12; H02K 19/103; H02K 29/03; H02K 29/06; H02K 1/06; H02K 1/14; H02K 1/146; H02K 1/24; H02K 1/246; H02P 25/00; H02P 25/098; H02P 7/05; F02C 9/00; F02C 9/24; F23N 5/00; F23N 5/003; B66B 11/00; B66B 11/04; B66B 11/0407
See application file for complete search history.

(56) References Cited

U.S. PATENT DOCUMENTS

| | | | | |
|---|---|---|---|---|
| 3,788,447 A | * | 1/1974 | Stephanoff | B65G 23/00 198/619 |
| 5,111,095 A | * | 5/1992 | Hendershot | H02K 19/103 174/DIG. 19 |
| 5,302,872 A | * | 4/1994 | Ohki | H02K 41/031 310/12.19 |
| 5,545,938 A | * | 8/1996 | Mecrow | H02K 3/18 310/156.64 |

(Continued)

FOREIGN PATENT DOCUMENTS

| | | |
|---|---|---|
| CN | 102355111 A | 2/2012 |
| CN | 203522352 U | 4/2014 |

(Continued)

OTHER PUBLICATIONS

Daldaban et al., New disc type switched reluctance motor for high torque density, Energy conversion and management, 2007, 48(8):2424-2431.

(Continued)

*Primary Examiner* — Tran N Nguyen
(74) *Attorney, Agent, or Firm* — Bajwa IP Law Firm; Haris Zaheer Bajwa

(57) ABSTRACT

A switched reluctance motor is disclosed. The switched reluctance motor includes a rotor, a stator, an air gap between the stator and the rotor, and a plurality of conductive elements. The plurality of conductive elements are disposed on the rotor.

18 Claims, 11 Drawing Sheets

(56) References Cited

U.S. PATENT DOCUMENTS

| | | | | |
|---|---|---|---|---|
| 5,838,087 A | * | 11/1998 | Tang | H02K 19/103 310/168 |
| 5,965,962 A | * | 10/1999 | Hinds | H02K 41/033 310/12.31 |
| 6,025,659 A | * | 2/2000 | Nashiki | H02K 41/03 310/12.18 |
| 6,305,501 B1 | * | 10/2001 | Kahkipuro | B66B 11/0407 187/250 |
| 7,663,283 B2 | | 2/2010 | Holtzapple et al. | |
| 8,754,568 B2 | | 6/2014 | Kim et al. | |
| 9,093,943 B2 | | 7/2015 | Ramu | |
| 9,106,122 B2 | | 8/2015 | Fahimi | |
| 2009/0302787 A1 | * | 12/2009 | Edelson | H02K 17/12 318/254.1 |
| 2012/0001502 A1 | | 1/2012 | Lee | |

FOREIGN PATENT DOCUMENTS

| | | |
|---|---|---|
| CN | 102315746 | 7/2014 |
| KR | 20150139283 A | 12/2015 |

OTHER PUBLICATIONS

Rahman et al., Design of high-efficiency and high-torque-density switched reluctance motor for vehicle propulsion, IEEE Transactions on Industry Applications, 2002, 38(6):1500-1507.

Toliyat et al., A five-phase reluctance motor with high specific torque, IEEE Transactions on Industry Applications, 1992, 28(3):659-667.

Desai et al., Novel switched reluctance machine configuration with higher number of rotor poles than stator poles: Concept to implementation, IEEE Transactions on Industrial Electronics, 2010, 57(2):649-659.

Ahn et al., Characteristics Analysis of Short Flux-path 4/3 SRM, Journal of International Conference on Electrical Machines and Systems, 2013, 2(1):40-44.

Michaelides et al., Short flux paths optimise the efficiency of a 5-phase switched reluctance drive, Thirtieth IAS Annual Meeting, IAS'95., Conference Record of the 1995 IEEE, 1995, 1:286-293.

Khor et al., A 3-phase 12/10 asymmetrical switched reluctance motor, Power Electronics and Applications, 2005 European Conference on, 2005:9.

Diko et al., A novel concept of short-flux path switched reluctance motor for electrical vehicles, Advances in Electrical and Electronic Engineering, 2015, 13(3):206.

Tanujaya et al., A Novel 6/5 Switched Reluctance Motor with Short Flux Path: Concept, Design and Analysis, Journa of International Conference on Electrical Machines and Systems, 2012, 1(1):47-53.

Zhang et al., Design and Analysis of a Segmental Rotor Type 12/8 Switched Reluctance Motor, Journal of Power Electronics, 2014, 14(5):866-873.

Ebrahimi et al., A High Torque Density Axial Flux SRM with Modular Stator, Iranian Journal of Electrical and Electronic Engineering, 2015, 11(4):336-344.

* cited by examiner

INDUCTION SWITCHED RELUCTANCE MOTOR

CROSS-REFERENCE TO RELATED APPLICATION

This application claims the benefit of priority from U.S. Provisional Patent Application Ser. No. 62/377,756, filed on Aug. 22, 2016, and entitled "INDUCTION SWITCHED RELUCTANCE MACHINE," which is incorporated herein by reference in its entirety.

TECHNICAL FIELD

The present disclosure generally relates to electric machines, and particularly to switched reluctance motors.

BACKGROUND

Switched Reluctance Motor (SRM) drives are one of the emerging technologies in the field of adjustable-speed drives. They have several advantages in terms of machine efficiency, power density, torque density, weight, volume, robustness, and operational flexibility. SRM drives have attracted considerable attention for a variety of industrial applications.

Increasing torque density in conventional SRMs may require a relatively smaller air gap. This may also force the machine into a highly saturated operation, accompanied by high radial forces causing mechanical noise and vibration.

There is therefore a need for a switched reluctance motor that can produce higher power and torque density. A need also exists for a switched reluctance motor that can operate at high performance without undesired effects, such as mechanical noise and vibration.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes a switched reluctance motor. The switched reluctance motor may include a rotor, a stator, an air gap between the stator and the rotor, and a first plurality of conductive elements. The first plurality of conductive elements may be disposed on the rotor.

The above general aspect may include one or more of the following features. In an example, the rotor may be non-segmental. In another example, the rotor may be located in a position that is interior of the stator, or exterior of the stator. In some examples, material of the rotor may include a ferromagnetic material. In addition, material of the stator may include a ferromagnetic material. In some cases, the first plurality of conductive elements may include a plurality of concentric wound windings or a plurality of solid conductive elements. The solid conductive elements may be elements that are made of conductive materials. In some implementations, the first plurality of conductive elements may be short-circuited. In addition, the rotor may include a first back iron and a plurality of rotor poles. The stator may further include a second plurality of conductive elements, a second back iron, and a plurality of stator poles. In some implementations, each element of the first plurality of conductive elements may be disposed between a first pair of adjacent poles of the plurality of rotor poles. In other implementations, each element of the second plurality of conductive elements may be disposed between a second pair of adjacent poles of the plurality of stator poles. In some cases, the second plurality of conductive elements may include a plurality of concentric-wound windings or a plurality of solid conductive elements. In an implementation, each conductive element of the first plurality of conductive elements and each element of the second plurality of conductive elements may include a full-pitch winding. In another implementation, each conductive element of the first plurality of conductive elements may include a short-pitch winding. The short-pitch winding may be a single tooth winding. Each conductive element of the second plurality of conductive elements may include a full-pitch winding. In another implementation, each conductive element of the first plurality of conductive elements and each conductive element of the second plurality of conductive elements may include a short-pitch winding. The short-pitch winding may be a single tooth winding. In an example, the plurality of rotor poles may be connected to the first back iron. In addition, the plurality of stator poles may be connected to the second back iron. In an aspect, the switched reluctance motor may be configured to operate at a plurality of separately excitable phases. In an aspect, each phase of the plurality of separately excitable phases may be excited by energizing a subset of the second plurality of conductive elements. In an implementation of energizing the subset of the second plurality of conductive elements, the energizing may include using pulses of direct current. In a case, a phase of the plurality of separately excitable phases may be associated to a stator pole of the plurality of stator poles and a short flux path. In addition, the short flux path may exclude the first back iron. In some implementations, a magnetic flux may traverse through the short flux path. The short flux path may include the stator pole, a portion of a rotor pole of the plurality of rotor poles, and a portion of the airgap that is located between the stator pole and the portion of the rotor pole. In some examples, the rotor pole may be adjacent to the stator pole.

In another general aspect, the present disclosure describes a switched reluctance motor that includes a stator, a rotor, and an airgap between the stator and the rotor. In some implementations, the stator may include a first back iron, a first plurality of conductive elements, and a plurality of stator poles. In some implementations, the rotor may include a second back iron, a second plurality of conductive elements, and a plurality of rotor poles. In an implementation, the switched reluctance motor may be configured to provide a short flux path for a magnetic flux. The short flux path may include a stator pole of the plurality of stator poles, a first portion of a rotor pole of the plurality of rotor poles, and a second portion of the airgap that is located between the stator pole and the first portion of the rotor pole. The rotor pole may be adjacent to the stator pole.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Disclosed herein is an electrical machine which may benefit from both reluctance and induction torques. In an aspect, the present disclosure is based on optimizing the flux path in the electrical machine using one or more conductive elements on the rotor. Benefits provided by this technique can include, but are not limited to, a high grade electromechanical energy conversion, high torque density, short flux path and low core loss. In some implementations, the machine may offer high performance in terms of high torque density and can be applied to a broad range of applications, including Electric, Hybrid Electric and Plug-in Hybrid Vehicles (EV/HEV/PHEV). In an aspect, the disclosed machine may be considered as a variable reluctance motor which benefits from the induction phenomenon, by implementing short-circuited conductive elements on the rotor. In some implementations, the conductive elements may modify the magnetic flux path based on the Lenz's law. This may lead to a desired short flux path that results in a higher torque. For purposes of clarity, the disclosed machine may be hereinafter referred to as an induction switched reluctance motor (ISRM).

Figure 1:
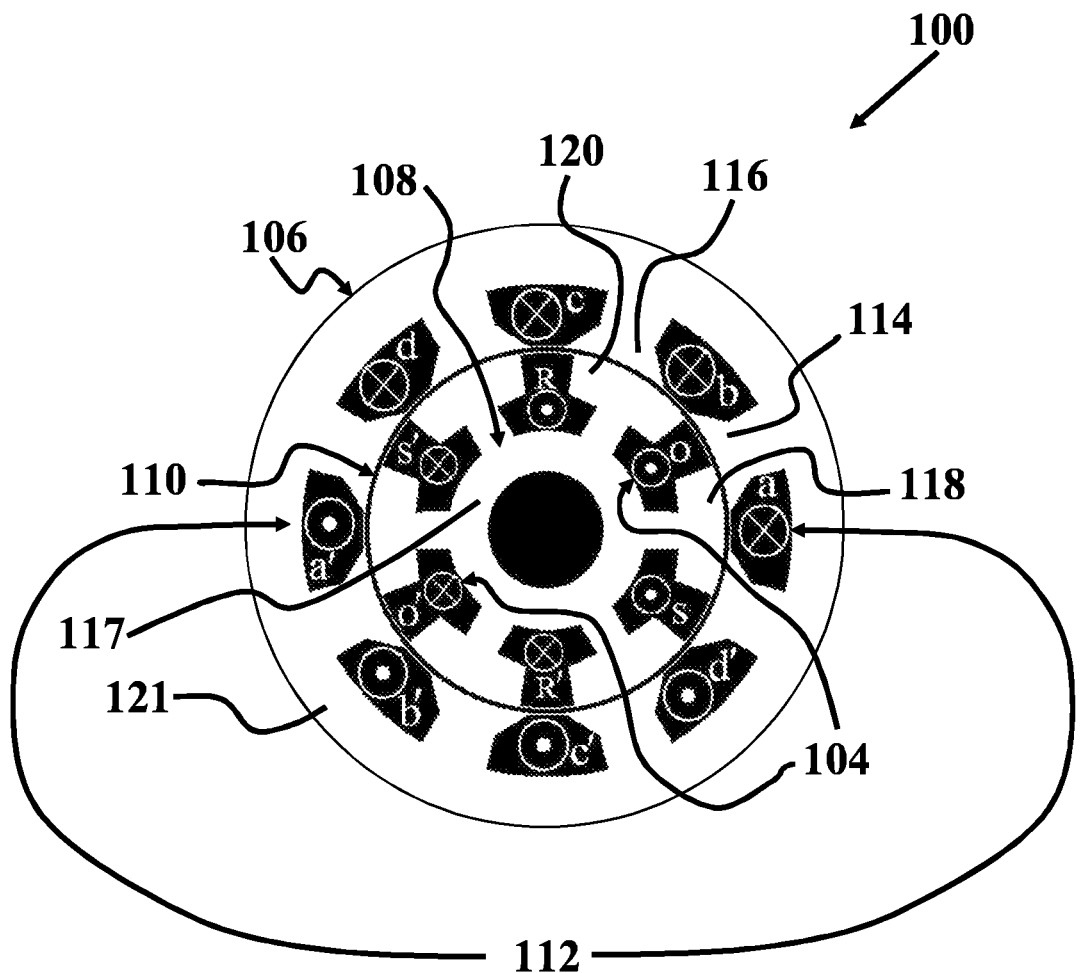
FIG. 1 illustrates an implementation of a switched reluctance motor with full-pitch windings on the stator and full-pitch windings on the rotor.

FIG. 1 depicts an implementation of the ISRM, designated by ISRM 100. In some implementations, the ISRM 100 may include a first plurality of conductive elements 104, a stator 106, a rotor 108, and a narrow air gap 110 between the stator 106 and the rotor 108. In an aspect, the first plurality of conductive elements 104 may be disposed on the rotor 108.

In some implementations, the rotor 108 may be non-segmental. In an aspect, the rotor 108 may be configured for rotation with respect to the stator 106. In different implementations, the rotor 108 may be placed interior of the stator 106, or exterior of the stator 106. In an example, the stator 106 and the rotor 108 may be made of ferromagnetic materials. In some cases, the first plurality of conductive elements 104 may include a plurality of concentric wound windings, or a plurality of solid conductive elements. In other implementations, the first plurality of conductive elements 104 may be short-circuited. In an implementation, the stator 106 may include a second plurality of conductive elements 112, and a back iron that may be referred herein as the stator back iron 121, and a plurality of stator poles. In a different implementation, the stator poles may include a first stator pole 114 and a second stator pole 116. In an example, the first stator pole 114 may be adjacent to the second stator pole 116. In another example, an element of the second plurality of conductive elements 112 (for example, the winding element "b" in FIG. 1) may be disposed between the first stator pole 114 and the second stator pole 116. In other words, in an implementation, each element of the second plurality of conductive elements 112 may be disposed between a pair of adjacent poles of the stator poles. In some implementations, the rotor 108 may include a back iron 117, herein referred to as the rotor back iron 117, and a plurality of rotor poles. In different implementations, the rotor poles may include a first rotor pole 118 and a second rotor pole 120. In other implementations, the first rotor pole 118 may be adjacent to the second rotor pole 120. In some cases, an element of the first plurality of conductive elements 104 (for example, the winding element "O" in FIG. 1) may be disposed between the first rotor pole 118 and the second rotor pole 120. In other words, in some examples, each element of the first plurality of conductive elements 104 may be disposed between a pair of adjacent poles of the rotor poles. In an example, the number of the stator poles and the number of the rotor poles may be selected based on the switched reluctance motor principles. For example, in an 8:6 ISRM, the number of stator poles is 8 and the number of the rotor poles is 6. In another example, the plurality of stator poles may be connected to the stator back iron 121. In a different case, the plurality of rotor poles may be connected to the rotor back iron 117. In some implementations, the second plurality of conductive elements 112 may include a plurality of concentric-wound windings or a plurality of solid conductive materials. In an implementation, the first plurality of conductive elements 104 may include full-pitch windings (represented by O-O', R-R', and S-S' in FIG. 1). In another implementation, the second plurality of conductive elements 112 may include full-pitch windings (represented by a-a', b-b', c-c', and d-d' in FIG. 1).

Figure 2:
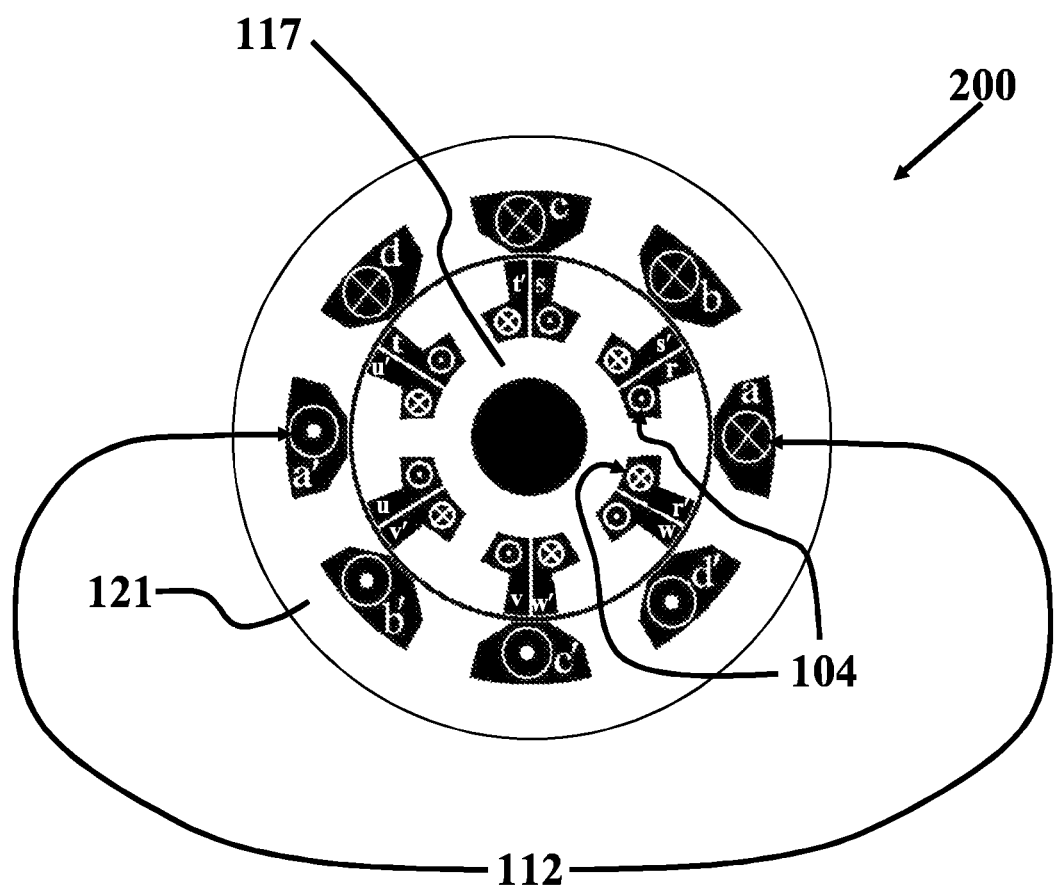
FIG. 2 illustrates an implementation of a switched reluctance motor with full-pitch windings on the stator and short-pitch windings on the rotor.

The ISRM 100 may be implemented in different topologies. For purposes of clarity, FIG. 2 depicts another implementation of the ISRM, represented by ISRM 200. In an implementation, the second plurality of conductive elements 112 may include full-pitch windings (for example, the windings a-a', b-b', c-c', and d-d' in FIG. 2) and, the first plurality of conductive elements 104 may include short-pitch windings (for example, the windings r-r', s-s', t-t', u-u', v-v', and w-w' in FIG. 2). In some implementations, each short-pitch winding may be wound around a single tooth.

Figure 3:
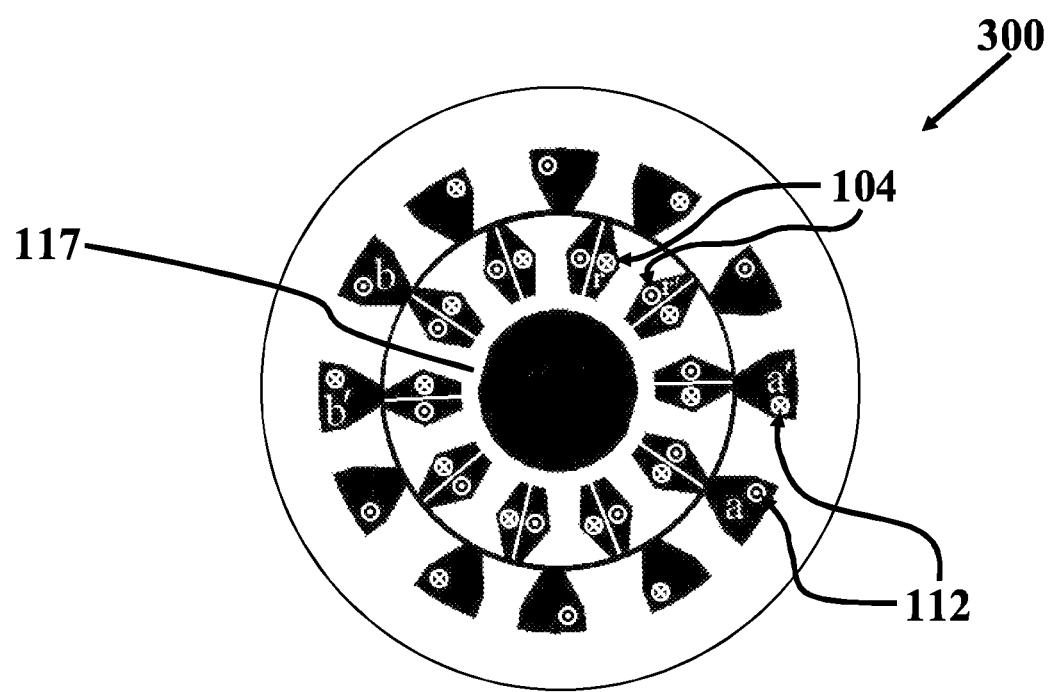
FIG. 3 illustrates an implementation of a switched reluctance motor with short-pitch windings on the stator and short-pitch windings on the rotor.

FIG. 3 depicts another implementation of the disclosed ISRMISRM 100, represented by ISRM 300. In some examples, the first plurality of conductive elements 104 may include short-pitch windings (represented by an example r-r' in FIG. 3) and the second plurality of conductive elements 112 may include short-pitch windings (represented by examples a-a' and b-b' in FIG. 3). In some implementations, each short-pitch winding may be a single tooth winding.

Figure 4:
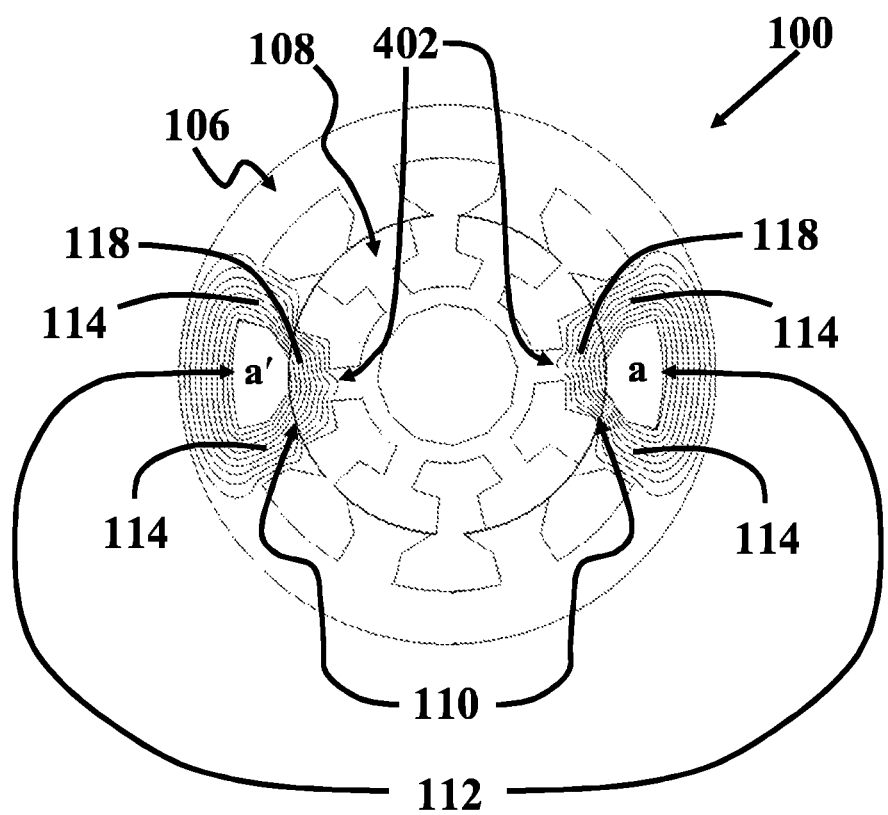
FIG. 4 illustrates a flux path in an implementation of a switched reluctance motor with full-pitch windings on the stator and full-pitch windings on the rotor.

FIG. 4 shows a flux path in an implementation of the ISRM 100 with full-pitch windings on both the stator and the rotor. In some implementations, the ISRM 100 may be configured to operate at a plurality of separately excitable phases. In different implementations, each phase may correspond to a subset of the second plurality of conductive elements 112 that are placed on one or more pairs of stator poles. For example, phase "a" may correspond to the winding a-a'. In some examples, each of the plurality of separately excitable phases may be excited by energizing a subset of the second plurality of conductive elements 112. In other examples, pulses of direct current—rather than conventional sinusoidal AC current—may be used to energize the subset of the second plurality of conductive elements 112. In an implementation, a given phase of the plurality of separately excitable phases, for example, phase "a" in the implementation of FIG. 4, may be associated to the first stator pole 114 (represented by four implementations in FIG. 4) and a short flux path 402. In an implementation, excitation of the given phase may cause an induction of a magnetic flux that traverses through the short flux path 402 in the ISRM 100. In another implementation, the short flux path may include the first stator pole 114 and a portion of the first rotor pole 118 (represented by two implementations in FIG. 4), when the first rotor pole 118 is adjacent to the first stator pole 114. In other words, in some implementations, a stator pole that corresponds to a given phase, and a portion of a rotor pole that is adjacent to the corresponding stator pole during the excitation of a given phase, may be included in a short flux path induced due to the excitation of a phase. In a different implementation, the short flux path 402 may include a portion of the air gap 110 that is located between the first stator pole 114 and the respective portion of the first rotor pole 118. In another implementation, the short flux path 402 may exclude the rotor back iron 117. In a case, the magneto-motive force (mmf) of the first plurality of conductive elements 104 and the second plurality of conductive elements 112 may include an orientation that creates the short flux path 402. In another case, excitation of any given phase of the ISRM 100 may cause induction of electrical current in the first plurality of conductive elements 104 while the rotor 108 is moving. As a result, in an example, the magnetic flux lines may be prevented from entering the rotor back iron 117, and the short flux path 402 may be created.

Figure 5:
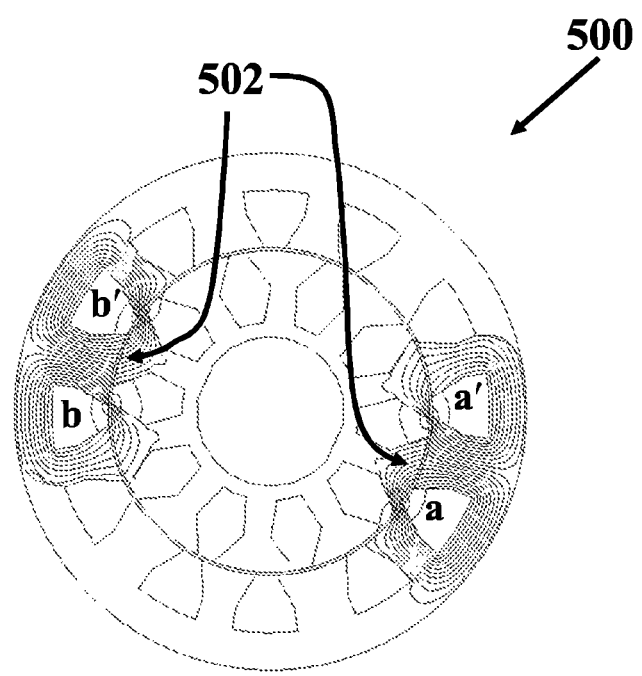
FIG. 5 illustrates a flux path in an implementation of a 12:10 switched reluctance motor with windings on the stator and the rotor.

To illustrate, FIG. 5 depicts an implementation of a 12:10 ISRM 500, according to the present disclosure. In an implementation, the flux path 502 may be provided when phase "a-b", corresponding to the winding a-a' and the winding b-b', is excited.

Referring back to FIG. 4, the relative positioning of the stator 106 and the rotor 108 is illustrated for an implementation of the ISRM 100, when the rotor 108 is not at an aligned position and phase "a" is excited. In a case, the rotor 108 may tend to move in a clockwise direction; thereby minimizing the reluctance of the system and achieving the shortest flux path in the air. In some implementations, under motoring mode of operation, an electromagnetic torque may be generated by the tendency of the magnetic circuit to minimize the reluctance.

Example 1: Simulation of an 8:6 ISRM

Figure 6:
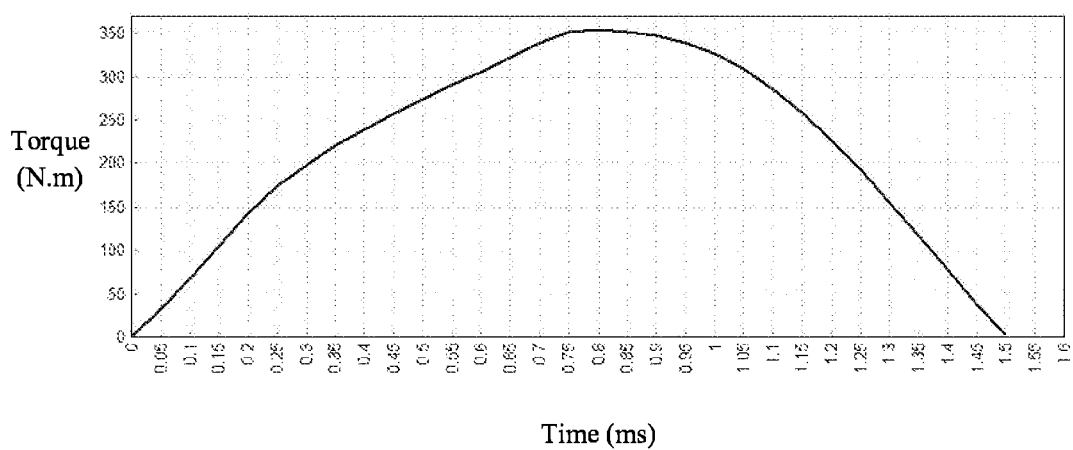
FIG. 6 is a diagram illustrating torque variations of an exemplary simulated 8:6 induction switched reluctance motor (ISRM) versus time.

FIG. 6 illustrates torque variations versus time for an exemplary simulated 8:6 ISRM with a constant speed (about 20000 deg/sec) under single phase excitation, while the rotor position changes from an unaligned position to an aligned position (about a 30 degrees region). Continuing with the sequence of the stator phases, it can be noticed that similar to a conventional SRM, a counterclockwise excitation pattern among stator phases may result in a clockwise motion and vice versa.

Example 2: Simulation of an 18:12 ISRM

In order to obtain torque characteristics of the ISRM, a two dimensional transient finite element model of an 18:12 ISRM was simulated in the following example. TABLE 1 includes the parameters of the simulated model of the 18:12 ISRM.

TABLE 1

| Parameters of the simulated ISRM model | |
|---|---|
| Stator outer radius | 150 mm |
| Stack length | 150 mm |
| Air gap | 0.5 mm |
| Number of stator poles | 18 |
| Number of rotor poles | 12 |
| Turn number of stator windings | 58 |
| Turn number of rotor windings | 58 |
| Rated current | 200 A |
| Maximum current density | 28 A/mm$^2$ |
| Rotor and stator material | M19 |
| Rotor and stator winding material | Copper |
| Cooling method | Direct liquid cooling |

The ISRM may be cooled using a direct liquid cooling method, such as spray oil cooling. Hence, the maximum current density of the conductors may be about 28 A/mm$^2$. In order to compare average torque of ISRM with a similar machine, a two dimensional transient finite element model of a conventional Switched Reluctance Machine (SRM) was designed and simulated. TABLE 2 includes the parameters of the simulated model of an 18:12 SRM. The designs and simulations were carefully performed to maintain the same stack lengths, same outer diameters, same wire gauges, same phase turn numbers, and same airgaps for both simulated models of the 18:12 ISRM and 18:12 SRM.

TABLE 2

Parameters of the simulated SRM model

| | |
|---|---|
| Stator outer radius | 150 mm |
| Stack length | 150 mm |
| Air gap | 0.5 mm |
| Number of stator poles | 18 |
| Number of rotor poles | 12 |
| Turn number of stator windings per phase | 58 |
| Rated current | 200 A |
| Maximum current density | 28 A/mm$^2$ |
| Rotor and stator material | M19 |
| Rotor and stator winding material | Copper |
| Cooling method | Direct liquid cooling |

Figure 7:
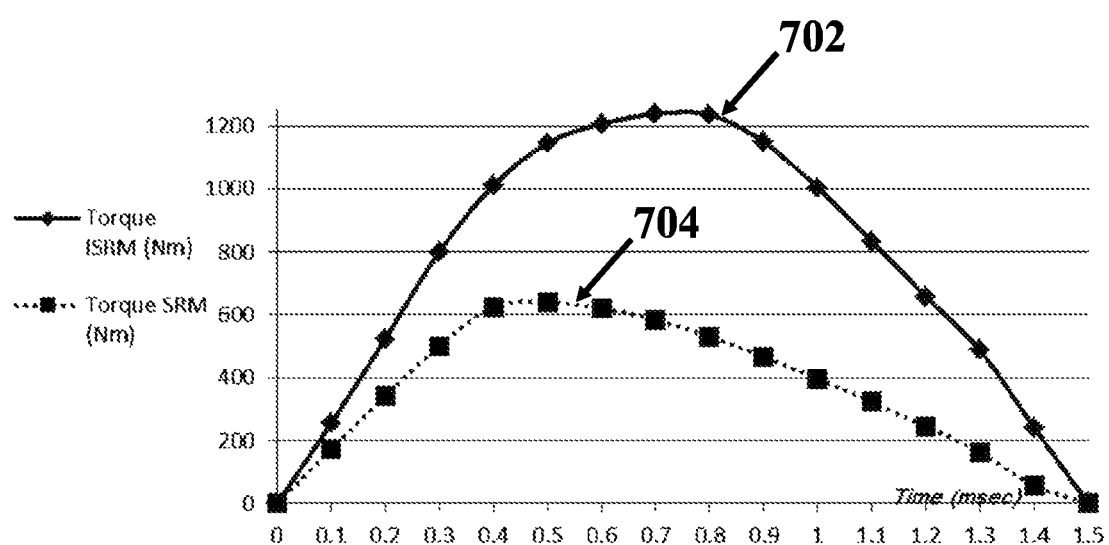
FIG. 7 is a diagram illustrating torque variations of an exemplary simulated 18:12 ISRM and a simulated conventional 18:12 switched reluctance motor (SRM) versus time.

FIG. 7 illustrates torque variations versus time for the exemplary simulated 18:12 ISRM and the simulated conventional 18:12 SRM, with a constant speed (about 10000 deg/sec) under single phase excitation, while the rotor position changes from an unaligned position to an aligned position (about a 15 degrees region). It can be observed that the ISRM torque 702 is considerably higher than the SRM torque 704.

Figure 8:
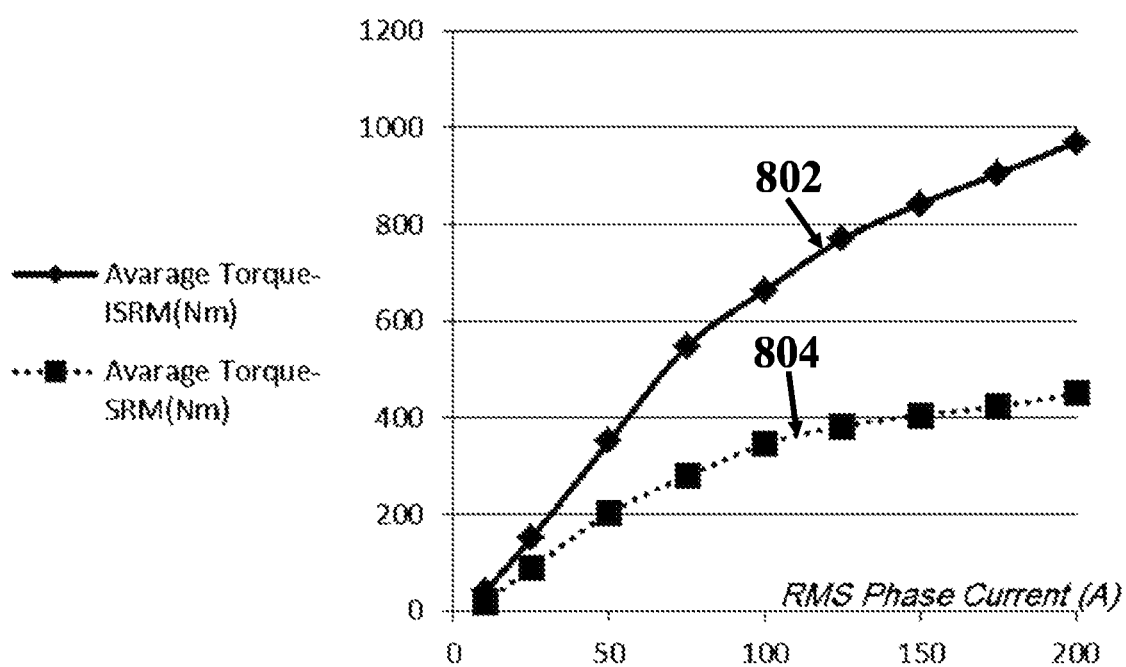
FIG. 8 is a diagram illustrating average torque variations of an exemplary simulated 18:12 ISRM and a simulated conventional 18:12 SRM for different values of RMS phase current.

FIG. 8 depicts average torque variations of the exemplary simulated 18:12 ISRM, and the simulated conventional 18:12 SRM for different values of the RMS phase current. It can be observed that the ISRM average torque 802 is about 215% higher than the SRM average torque 804 at the nominal current (about 200 A in this example). It can also be seen that the torque per ampere of the ISRM at different currents is higher than that of the SRM.

Figure 9:
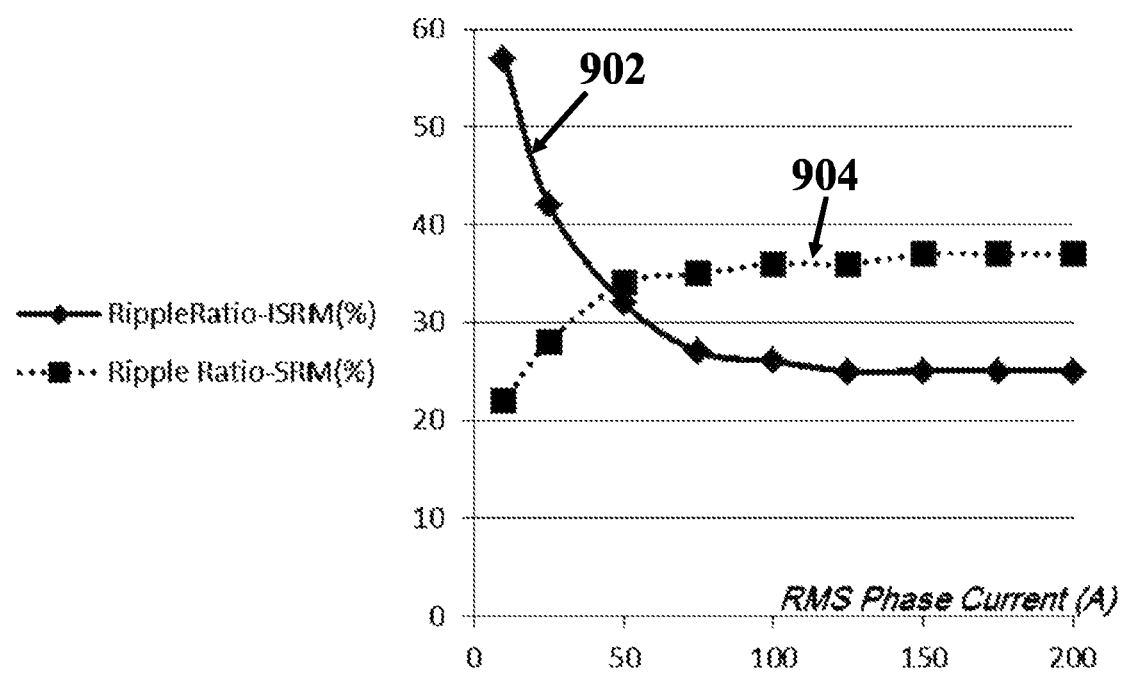
FIG. 9 is a diagram illustrating torque ripple ratio (TRR) variations of an exemplary simulated 18:12 ISRM, and a simulated conventional 18:12 SRM for different values of RMS phase current.

FIG. 9 illustrates torque ripple ratio (TRR) variations of the exemplary simulated 18:12 ISRM, and the simulated conventional 18:12 SRM for different values of the RMS phase current. TRR is defined as the difference between maximum torque and the average torque divided to the maximum torque. It can be observed that the ISRM TRR 902 is lower than the SRM TRR 904 in currents above 25% of the nominal current.

Figure 10:
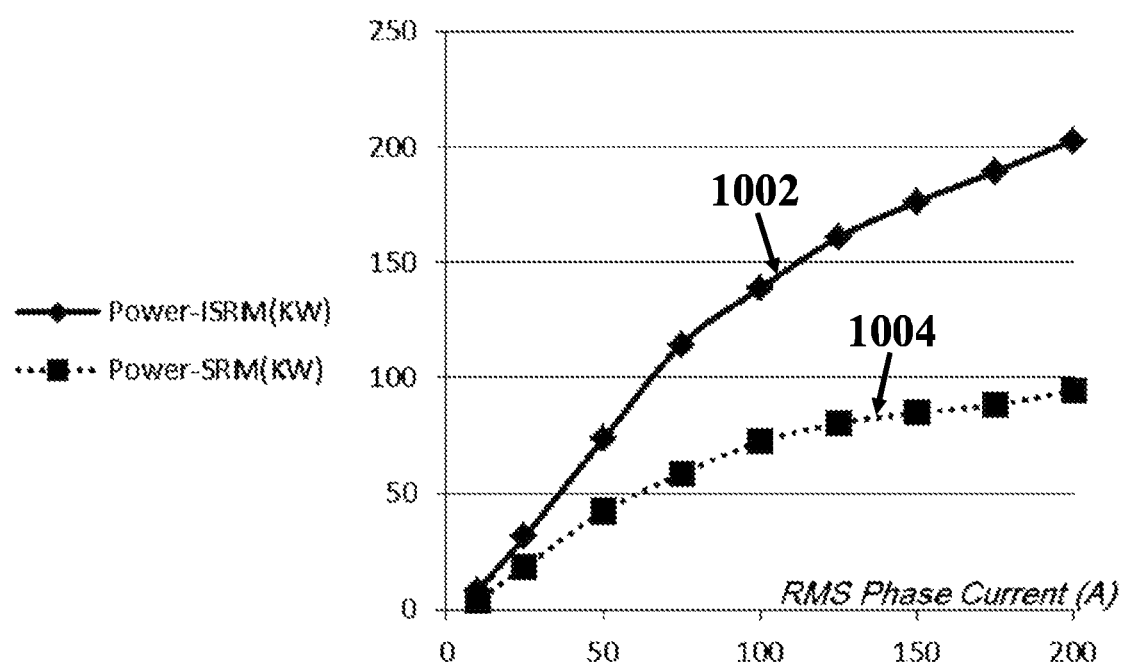
FIG. 10 is a diagram illustrating output power variations of an exemplary simulated 18:12 ISRM and a simulated conventional 18:12 SRM versus RMS phase current.

FIG. 10 depicts output power variations of the exemplary simulated 18:12 ISRM, and the simulated conventional 18:12 SRM versus RMS phase current, for the rotor speed of about 2000 rpm. It can be seen that the ISRM output power 1002 is significantly higher than the SRM output power 1004, at all RMS phase currents in the illustrated range.

Figure 11:
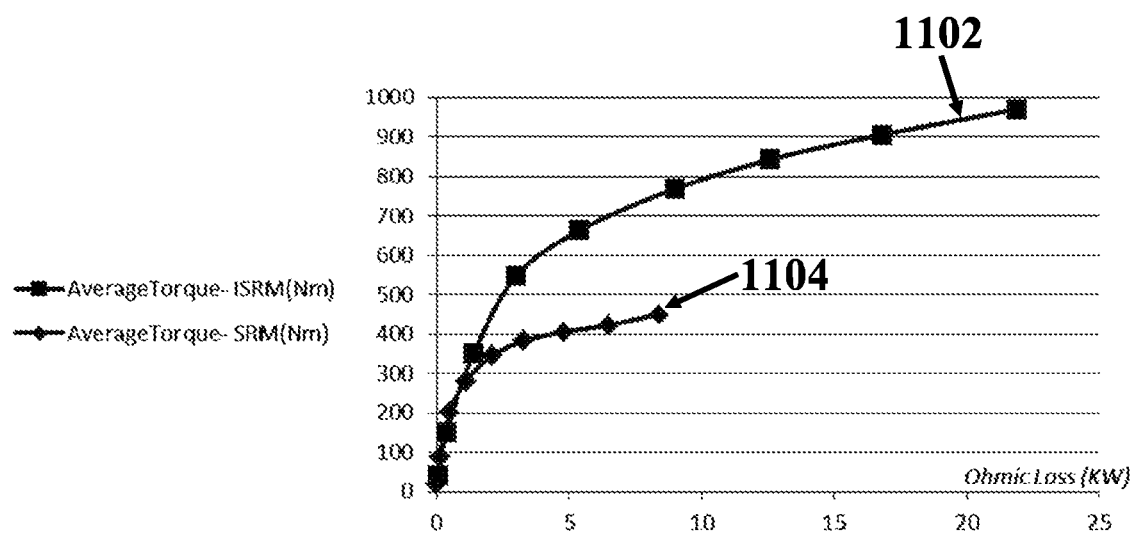
FIG. 11 is a diagram illustrating average torque variations of an exemplary simulated 18:12 ISRM and a simulated conventional 18:12 SRM versus ohmic loss.

FIG. 11 illustrates average torque variations of the exemplary simulated 18:12 ISRM, and the simulated conventional 18:12 SRM versus ohmic (copper) loss. It can be observed that the copper losses of the ISRM in different ISRM average torques 1102 are lower than the copper losses of the SRM in different SRM average torques 1104. For example, at about 9 kW of copper loss, ISRM produces about 760 N·m average torque, whereas the torque produced by SRM is about 450 N·m. It can also be seen that, when the torque generated by SRM and ISRM is almost equal, ISRM has lower copper loss than SRM. These are among example advantages of ISRM.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A switched reluctance motor, comprising:
a stator;
a rotor configured to rotate with respect to the stator, the rotor comprising a first back iron and a plurality of rotor poles;
an air gap between the stator and the rotor; and
a first plurality of conductive elements, the first plurality of conductive elements disposed on the rotor; wherein:
the stator comprises a second plurality of conductive elements, a second back iron, and a plurality of stator poles,
the second plurality of conductive elements associated with a plurality of separately excitable phases, and
each phase of the plurality of separately excitable phases configured to be excited by energizing a subset of the second plurality of conductive elements using pulses of direct current.

2. The motor of claim 1, wherein the rotor is non-segmental.

3. The motor of claim 1, wherein the rotor is located in a position, the position being interior of the stator.

4. The motor of claim 1, wherein the rotor is located in a position, the position being exterior of the stator.

5. The motor of claim 1, wherein
the rotor includes a first material,
the first material includes a ferromagnetic material,
the stator includes a second material, and
the second material includes a ferromagnetic material.

6. The motor of claim 1, wherein the first plurality of conductive elements includes a plurality of concentric wound windings.

7. The motor of claim 1, wherein the first plurality of conductive elements includes a plurality of solid conductive elements.

8. The motor of claim 1, wherein the first plurality of conductive elements are short-circuited.

9. The motor of claim 1, wherein:
each element of the first plurality of conductive elements is disposed between a first adjacent poles pair of the plurality of rotor poles, and
each element of the second plurality of conductive elements is disposed between a second adjacent poles pair of the plurality of stator poles.

10. The motor of claim 1, wherein the second plurality of conductive elements include a plurality of concentric wound windings.

11. The motor of claim 1, wherein the second plurality of conductive elements include a plurality of solid conductive elements.

12. The motor of claim 1, wherein:
each conductive element of the first plurality of conductive elements and
each conductive element of the second plurality of conductive elements includes a full-pitch winding.

13. The motor of claim 1, wherein:
each conductive element of the first plurality of conductive elements includes a short-pitch winding,
the short-pitch winding includes a single tooth winding, and
the conductive element of the second plurality of conductive elements includes a full-pitch winding.

14. The motor of claim 1, wherein:
each conductive element of the first plurality of conductive elements includes a short-pitch winding,
the plurality of stator poles comprise a plurality of adjacent poles pairs, each of the plurality of adjacent poles pairs comprising a first stator pole and a second stator pole, a width of the first stator pole being at least twice as large as a width of the second stator pole,
each conductive element of the second plurality of conductive elements comprises a short-pitch winding wound around the first stator pole, and
the short-pitch winding includes a single tooth winding.

15. The motor of claim 1, wherein:
the plurality of rotor poles are connected to the first back iron, and
the plurality of stator poles are connected to the second back iron.

16. The motor of claim 1, wherein a number of the plurality of stator poles is equal to or smaller than 18.

17. The motor of claim 1, wherein:
each phase of the plurality of separately excitable phases is associated with one respective stator pole of the plurality of stator poles and a short flux path, and
the short flux path excludes the first back iron.

18. The motor of claim 1, wherein the short flux path comprises:
a stator pole among the plurality of stator poles,
a portion of a rotor pole among the plurality of rotor poles, the rotor pole being adjacent to the stator pole, and
a portion of the air gap, the portion of the air gap being located between the stator pole and the portion of the rotor pole.

* * * * *